United States Patent
Aigner et al.

(10) Patent No.: US 12,358,046 B2
(45) Date of Patent: Jul. 15, 2025

(54) DYNAMIC PRODUCTION PLANNING METHOD FOR CONTINUOUS CASTING PLANTS

(71) Applicants: Primetals Technologies Austria GmbH, Linz (AT); Primetals Technologies Germany GmbH, Erlangen (DE)

(72) Inventors: Christoph Aigner, Neumarkt (AT); Kai Ankermann, Neunkirchen a.B. (DE); Daniel Fuchshuber, Pucking (AT)

(73) Assignees: PRIMETALS TECHNOLOGIES AUSTRIA GMBH (AT); PRIMETALS TECHNOLOGIES GERMANY GMBH (DE)

( * ) Notice: Subject to any disclaimer, the term of this patent is extended or adjusted under 35 U.S.C. 154(b) by 86 days.

(21) Appl. No.: 17/916,138

(22) PCT Filed: Apr. 8, 2021

(86) PCT No.: PCT/EP2021/059193
§ 371 (c)(1),
(2) Date: Sep. 30, 2022

(87) PCT Pub. No.: WO2021/204950
PCT Pub. Date: Oct. 14, 2021

(65) Prior Publication Data
US 2023/0111359 A1 Apr. 13, 2023

(30) Foreign Application Priority Data

Apr. 9, 2020 (EP) .................................... 20169019

(51) Int. Cl.
*B22D 11/16* (2006.01)
*B22D 11/12* (2006.01)
*G05B 19/418* (2006.01)

(52) U.S. Cl.
CPC ............ *B22D 11/163* (2013.01); *B22D 11/12* (2013.01); *G05B 19/41865* (2013.01)

(58) Field of Classification Search
CPC .................................................... B22D 11/163
See application file for complete search history.

(56) References Cited

U.S. PATENT DOCUMENTS

| 6,665,572 | B2 | 12/2003 | Buervenich et al. ......... 700/103 |
| 2011/0300397 | A1* | 12/2011 | Sugita .............. G05B 19/41875 164/151.1 |
| 2014/0166753 | A1* | 6/2014 | Guha ............... G06K 19/06121 235/494 |

FOREIGN PATENT DOCUMENTS

| CN | 1556486 A | 12/2004 |
| CN | 104942250 A * | 9/2015 |

(Continued)

OTHER PUBLICATIONS

International Search Report mailed Jul. 5, 2021 in corresponding PCT International Application No. PCT/EP2021/059193.

(Continued)

*Primary Examiner* — Kevin E Yoon
*Assistant Examiner* — Jacky Yuen
(74) *Attorney, Agent, or Firm* — OSTROLENK FABER LLP

(57) ABSTRACT

A dynamic production planning method for a continuous casting plant for casting a strand with a production system which has a predefined production plan, which method includes comparing target production parameters with actual production parameters. If the actual production parameters deviate from the target production parameters, a strand image is created on the basis of actual production parameters. With the aid of the calculated strand image, a check is carried out within the predefined production plan and, if possible, a new production plan is created. If no solution can (Continued)

be found from the predefined production plan, the strand image is transmitted to a production planning system. The production planning system creates a new production plan from all available orders on the basis of a predefined optimization criterion. The new production plan is subsequently transmitted to the production system.

6 Claims, 3 Drawing Sheets

(56) References Cited

FOREIGN PATENT DOCUMENTS

| | | |
|---|---|---|
| CN | 105243512 A | 1/2016 |
| DE | 10047381 A1 | 4/2002 |

OTHER PUBLICATIONS

European Search Report mailed Sep. 28, 2020 in corresponding European Application No. 20169019.5.

* cited by examiner

DYNAMIC PRODUCTION PLANNING METHOD FOR CONTINUOUS CASTING PLANTS

CROSS-REFERENCE TO RELATED APPLICATIONS

The present application is a 35 U.S.C. §§ 371 national stage application of International Application No. PCT/EP2021/059193, filed Apr. 8, 2021, which claims priority to European Patent Application No. 20169019.5, filed Apr. 9, 2020, the contents of which are incorporated herein by reference.

TECHNICAL FIELD

The present invention relates to the field of continuous casting plants in the metal-producing industry.

On the one hand, the invention relates to a dynamic production planning method for a continuous casting plant for casting a strand, having a production system and a predefined production plan.

On the other hand, the invention relates to a continuous casting plant. Furthermore, the invention comprises a computer program which carries out the dynamic production planning method for a continuous casting plant.

PRIOR ART

Continuous casting is a continuous process for producing semi-finished products. In this process, for example, a liquid steel produced in the steelworks is cast in a cooled mold and cooled in a strand guide until it has completely solidified.

The solidified strand is cut to length on flame cutting machines in accordance with the production order and transported away for further processing.

Production plans for an entire production line are created in MES (Manufacturing Execution Systems) or PPS (Production Planning Systems)—also referred to as level 3 (L3) systems, which combine existing customer orders, which are stored in an order management system—level 4 (L4) system—on the basis of rules. Subsequently, the production plans created are transmitted to the individual units as a production order. From the order data received, the process optimization system—level 2 (L2) system—calculates production instructions as well as the product plan. On the basis of the calculated product plan, setting values for a mold format and length specification are issued to a flame cutting machine.

As long as the process is operated or can be operated in accordance with the production instructions for the respective steel grade, production takes place in accordance with the calculated product plan.

However, due to process-engineering boundary conditions, process events, system malfunctions and deviations in the steel supply, operation outside the production instructions may occur.

Current process optimization systems detect deviations from the production instructions and set corresponding scrap regions and quality assessments.

For scrap regions, the cutting plan is adjusted according to the scrap position. However, it is only possible to respond within the predefined product limits or to replace planned products with standardized stock lengths.

In case of deviations from the planned product quality, the product is produced according to the planned dimensions but cannot be used for the customer order.

Since in such cases the resulting product cannot be allocated directly to a customer order, the operator incurs costs for post-processing, storage, loss of production and/or scrapping.

Currently, the production plan is prepared in advance and it is only afterwards that the response to deviations from the plan is taken into account in the planning system.

There is no dynamic response of the production planning system to production events during the production of semi-finished products, i.e. before the product is cut.

Deviations from the production planning can occur due to process events, quality deviations or deviations in the product width.

Process events are understood to mean operational events. These can be, for example, tundish changes, immersion pipe changes or other maintenance measures. These process events have an effect on product quality and these regions must be cut out of the strand and are so-called scrap pieces.

In this case, an attempt is made, by optimizing the cutting length, to modify the products within their planned minimum and maximum dimensions in such a way that the scrap piece comes to lie at one end of the product. Depending on the length of the scrap piece, it is either cut off directly or the product length is lengthened—by the length of the scrap piece.

If optimization within the product limits is not possible, planned products are replaced by alternative products until a solution with the highest possible yield is achieved. Since this is unplanned production, these products must be temporarily stored.

Quality deviations can be determined by an online quality prediction of the level 2 system. In such a case, the product is downgraded and rescheduling to another customer order takes place only afterwards.

If the mold format cannot be set to a required width owing to process conditions or faults, there are deviations in a product width which cannot be remedied in the further course of production. This deviation in the product width initially does not lead to any change in the product plan. The products are produced with the originally planned target length. An exception here is calculation with weight optimization, in which the slab length is adjusted in such a way as to achieve the planned product weight. However, this is rarely used.

CN105243512A shows dynamic production planning for the operation of a steelworks.

CN1556486A discloses an integrated online planning and scheduling system and methods for the production process of a steel company.

Document DE 10047381 A1 discloses a method for operating an installation in the basic materials industry, wherein products are produced which are allocated to different production orders. A production plan with the method steps of order selection, pre-planning, plan creation and optimization is created.

SUMMARY OF THE INVENTION

It is the object of the invention to make available a method which ensures production that is as cost-effective as possible, with minimum rejects and reduced storage costs.

The object is achieved by the method mentioned at the outset, which comprises the following:
 a comparison of setpoint production parameters with actual production parameters.
 If the actual production parameters deviate from the setpoint production parameters, a strand image is created on the basis of actual production parameters. The strand image comprises the strand which has already been cast and has not yet been cut, and at least that strand which is obtained on the basis of a residual weight in the tundish and predefined parameters.

Checking, on the basis of the calculated strand image, takes place within the predefined production plan and, if possible, a new production plan is created.

If no solution can be found from the predefined production plan, the strand image is transmitted to a production planning system.

The production planning system creates a new production plan from all available orders on the basis of a predefined optimization criterion.

The new production plan is then transmitted to the production system.

By comparing setpoint and actual production parameters, deviations in production are detected. The setpoint and actual production parameters and setpoint production parameters are, inter alia, parameters of the continuous casting plant and/or parameters which characterize the casting process in the continuous casting plant. Examples of such actual production parameters are a casting speed of the strand, a casting level, a mold width, a casting cooling parameter, a temperature of the melt and/or a casting powder thickness. In the event of a deviation, the strand image is formed by a very wide variety of parameters. Such parameters are, for example, a width profile of the strand, a width profile in the tundish, lengths, scrap positions, target qualities of the specified products and many others. The strand image comprises the strand which has already been cast up to a so-called zero point. In the ideal case, the zero point is an already completed cut edge of the strand which is being cast. However, the zero point can also be located after this cut edge. It depends on the extent to which it is still possible to respond to detected production deviations. It is thus dependent on response times of the individual systems, for example when the command to cut the flame cutting machine can no longer be reversed owing to response times of the individual systems. Furthermore, the strand image also includes that part which is obtained on the basis of the production parameters and the residual weight in the tundish. This is therefore a prediction based on known parameters. A solution is sought from this strand image in the predefined production plan. If no solution can be found from this, the strand image is transmitted to a production planning system. All existing orders are collected in the production planning system. Matching orders can be found by comparison with the strand image. By means of an optimization criterion—for example, the maximum possible sales revenue with the minimum possible storage period or the maximum possible sales revenue with the prioritization of low-priority but suitable orders—a new production plan can be created. The new production plan is then transmitted to the production system. The new production plan replaces the predefined production plan and the strand is then cut and/or produced on the basis of the new production plan. The production plan contains at least one required product dimension—such as setpoint, minimum, maximum length, width, thickness. Additional plant-dependent information is also included, such as customer order numbers, target quality, destination.

An advantageous embodiment envisages that the strand image is formed from at least one of the following parameters:
width profile on the strand
width profile in the tundish,
scrap positions and lengths,
quality prediction for the strand,
product limits of the calculated solution for a product specification,
target quality of the specified products The width profile on the strand includes the width of the cast strand as well as the positions of width changes. The width profile in the tundish contains width specifications which can no longer be changed. The scrap positions and lengths are positions and lengths of scrap pieces in the strand, which arise, for example, during the tundish changeover. The quality prediction for the strand is calculated by a quality prediction model for any desired strand sections. The product limits of the calculated solution for the product specification contain the solution currently calculated by the production system for the cutting positions. The target quality of the specified products contains the assigned target quality of the calculated solution for the product specification.

A preferred embodiment envisages that a unique key, preferably a hash code, is calculated on the basis of the strand image, and this is used in data exchange with the production system and the production planning system. This unique key makes it possible to determine very quickly whether relevant data of the strand image have changed between two calculation cycles. A further advantage due to this unique key is that, when the new production plan is transmitted, it can be determined on the basis of this key whether the correct strand image has been stored. An error could be detected from deviations—in the key sent to the production planning system and subsequently transmitted by the latter to the production system. It is also possible for the case to occur during transmission that the newly created production plan is no longer valid since the strand image has changed once more in the meantime. This case can be immediately detected from the unique key.

Example of a hash code calculation as a key:

```
public int hashCode( ) {
    final int PRIME = 31;
    int result = strandID;
    result = PRIME * result + ((width profile == zero) ? 0 :
    widthprofile.hashCode ( ));
    result = PRIME * result + ((width profile == zero) ? 0 :
    defectMap.hashCode ( ));
    result = PRIME * result + ((quality result == zero) ? 0 :
    qualityresult.hashCode ( ));
    return result;
}
```

One advantageous embodiment provides that the optimization criterion is a maximum possible sales revenue with a minimum possible storage period or a maximum possible sales revenue with the prioritization of low-priority but matching orders.

One expedient embodiment envisages that a connection between the production system and the production planning system is a decoupled, bi-directional connection. A decoupled system ensures that production continues during the search for a new production plan in the production planning system. This takes place in accordance with the last specified and valid production plan. The production planning system searches independently for a solution to the optimization problem without stopping or changing the current production run in any way. A change takes place only when the new production plan is transmitted to the production system.

One expedient embodiment envisages that the production plan is a cutting plan with a setpoint length, minimum length, maximum length, width and/or thickness.

The object is also achieved by the continuous casting plant mentioned at the outset, which has at least one computer system for carrying out the above-described method. By means of this continuous casting plant, the advantages already described above are obtained.

One advantageous embodiment envisages that the continuous casting plant has a first computer system for a production system and a second computer system for a production planning system. The first computer system and the second computer system are connected to one another by a decoupled bi-directional connection.

The object is furthermore achieved by means of a computer program comprising commands which ensure that the continuous casting plant described above carries out the method steps according to the method described above.

DESCRIPTION OF THE EMBODIMENTS

Figure 1:
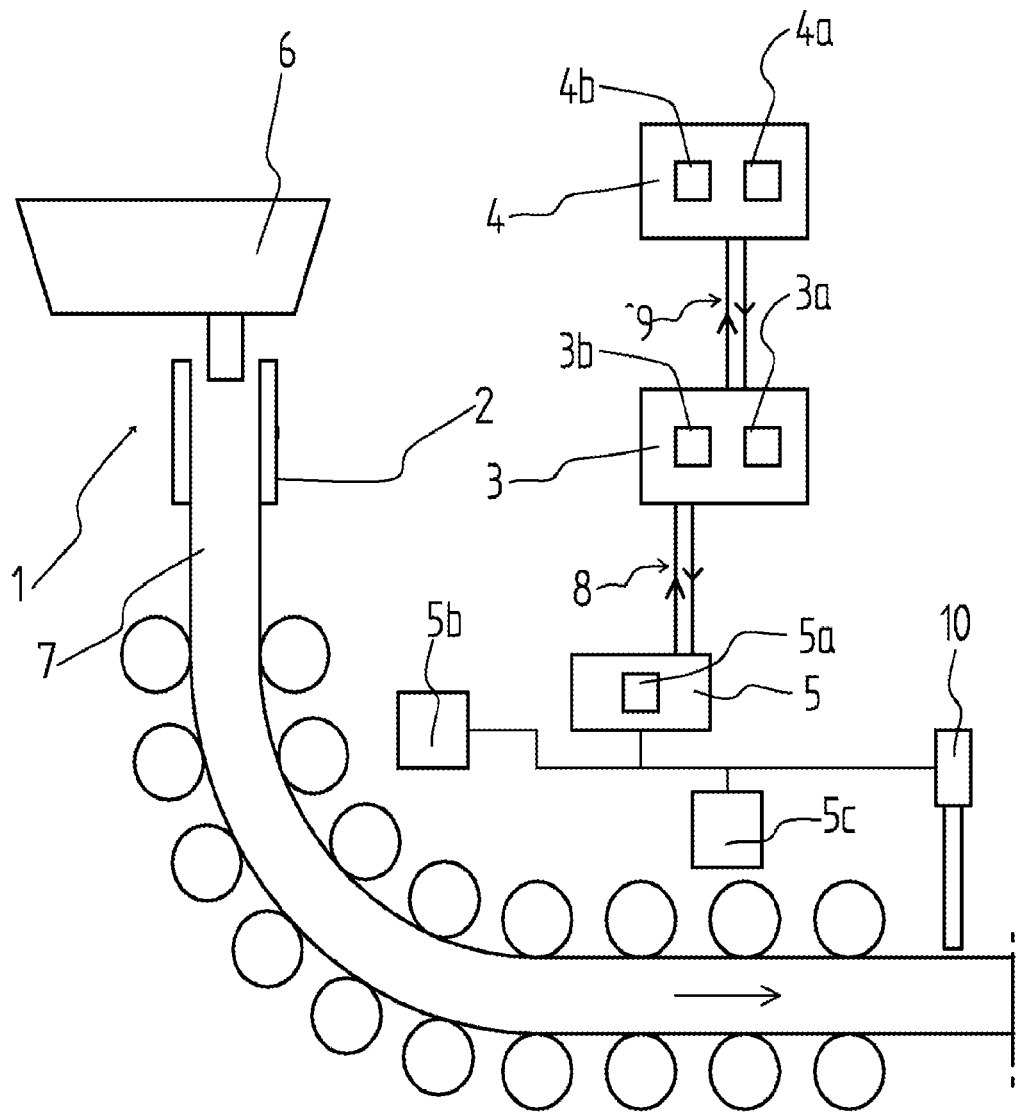
FIG. 1 shows a schematic illustration of a continuous casting plant.

In FIG. 1, a continuous casting plant 1 is illustrated schematically. Liquid metal 6 is poured into a mold 2 and a cast strand 7 is then drawn off from the mold 2. A production system 3 is implemented on a computer system. By means of the production system 3, which has a process and model calculation 3a and a memory system 3b, data with positions—at which a flame cutting machine 10 is to cut the strand 7—are transmitted to a programmable logic controller 5a. The production system 3 receives input parameters from the production planning system 4 and the closed-loop and open-loop electronic control system 5. The production planning system 4 is also implemented on a computer system. These input parameters can be transmitted, on the one hand, by the programmable logic controllers 5a via a data line 8 and/or by a higher-order control system of the industrial plant. The programmable logic controller 5a is connected to measuring instruments 5b and/or control elements 5c. The parameters detected by the measuring instruments 5b are, for example, the measured strand dimensions, temperature of the melt, casting speed and/or parameters of the cooling section. A composition of the melt is available to the production system 3 or can be called up from a memory 3b.

If, for example, the production system 3 detects deviations from actual values with respect to setpoint values during production, a strand image is calculated and the production system 3 attempts to reconfigure a predefined production plan in such a way as to compensate for these deviations. The actual parameters are calculated by the process and model calculation 3a. If this is not possible, the strand image is transmitted to the production planning system 4 via the decoupled bi-directional connection 9. The planning system retrieves available customer orders from the order book 4b and attempts to create a new production plan on the basis of the parameters stored in the production planning computer 4a. As soon as the new production plan has been determined, it is transmitted from the production planning system 4 to the production system 3.

Figure 2:
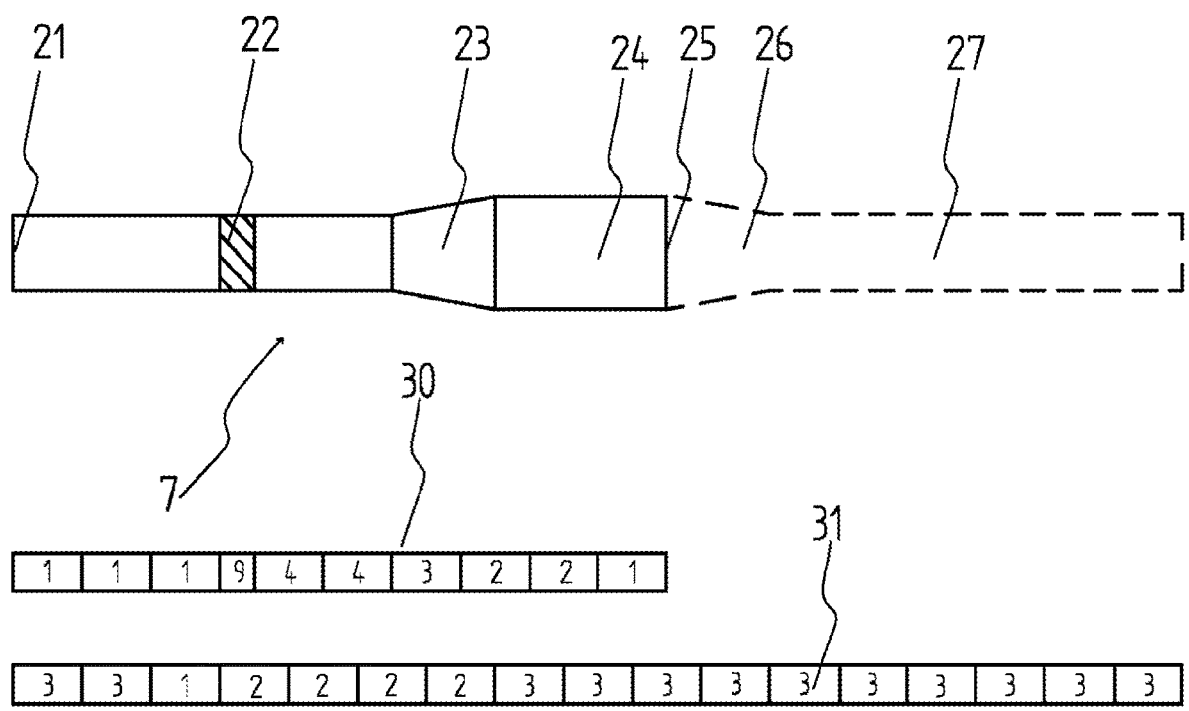
FIG. 2 shows a strand with associated quality information.

FIG. 2 illustrates a strand 7 as it can occur in a running production process. Here, the casting direction is to the left from the mold position 25. The strand 7 has a cut edge 21, which forms a possible zero point. This zero point can also be further behind owing to processing times. A section that cannot be used for further production is a scrap region 22.

A width change region 23 occurs when the width settings of the mold are increased or decreased. A region which forms a changed width region 24 then occurs. A region from the cut edge 21 to the mold position 25 forms that region which has already been cast. The width change region 26 and the residual region 27 form those regions which result from a residual quantity of liquid metal in the tundish. These two regions are therefore only produced at the time of observation.

In a quality prediction 30, calculated actual qualities for individual strand sections are formed. In a target quality 31, those qualities are depicted which were originally to be generated by the predefined production plan. As can be seen from the comparison of quality prediction 30 and target quality 31, these do not coincide, as a result of which a new production plan is to be created.

Figure 3:
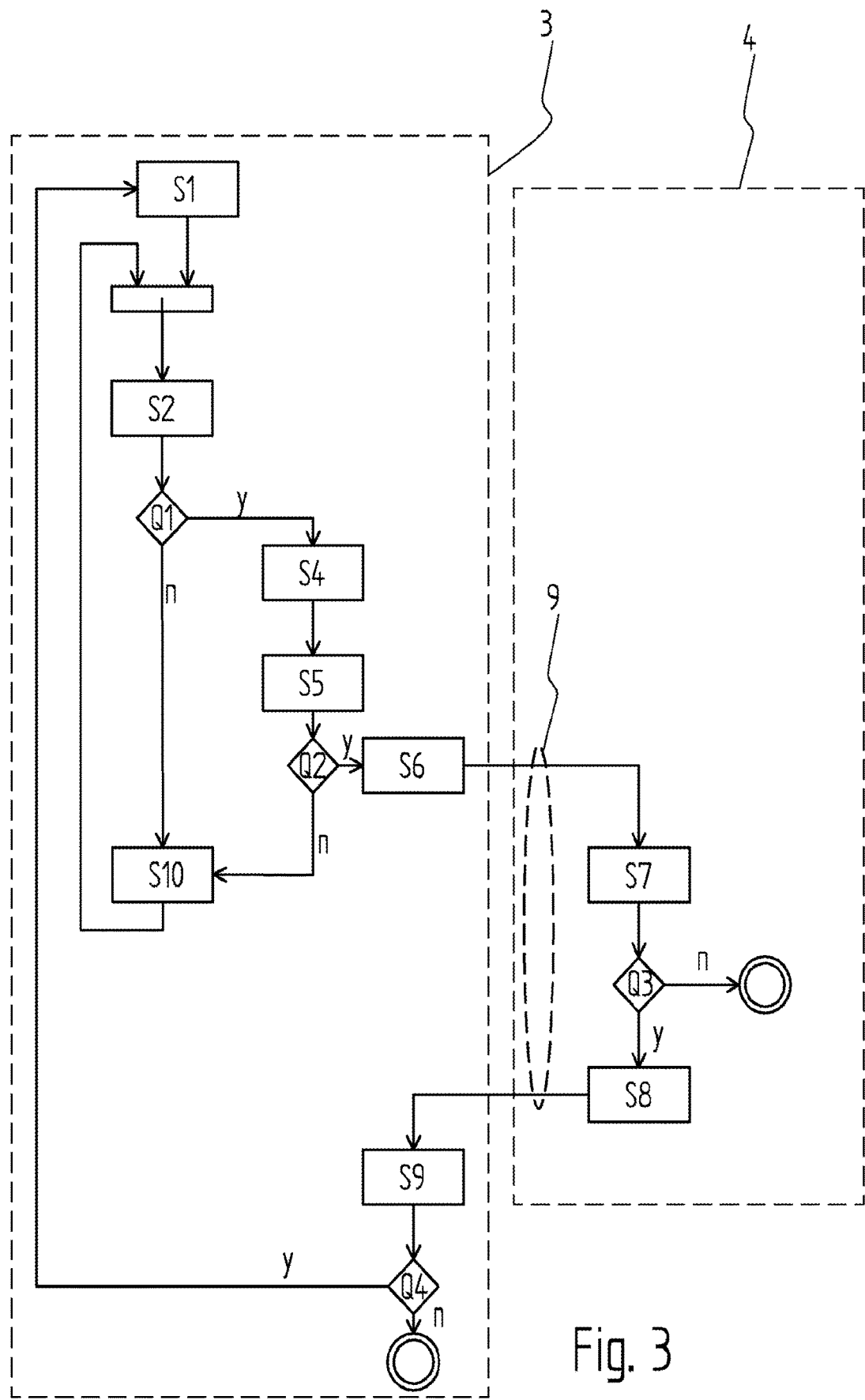
FIG. 3 shows an activity diagram for the method described.

FIG. 3 shows an activity diagram.

In step S1, the production plan is always updated. In the next step S2, the cutting plan is calculated on the basis of the production plan. If no deviation is found in the interrogation Q1, there follows step S10, in which the corresponding cutting lengths are specified and these are transmitted from the production system 3 (level 2 system) to a flame cutting machine. In the event of a deviation, a step S4—the creation of a strand image—is initiated in the interrogation Q1. The strand image created is checked in step S5 and, in the event of a deviation in the interrogation Q2, step S6 is initiated, which generates a request message and transmits it to a production planning system 4. The connection between the production system 3 and the production planning system 4 is advantageously effected via a decoupled bi-directional connection 9. In one advantageous embodiment, this request message contains a calculated unique key, which subsequently serves as an identification in the further data exchange between the production system 3 and the production planning system 4. This key makes it possible to determine quickly whether relevant data have changed between calculation steps. In step S7, the request message is used by the production planning system 4, and a check of the entire order book is carried out in step S7 on the basis of this request message. The finding of suitable customer orders is checked in the interrogation Q3. If this is the case, a production plan update is created in step S8 and a response message is transmitted to the production system 3. In the case that no suitable customer orders are found in the interrogation Q3, no update of the production plan is created. In this situation, the production system 3 continues to operate with the originally specified production plan, or the production system changes the production plan in accordance with other specifications.

If a production plan update has been created, it is transmitted by response message via the decoupled bi-directional connection 9 from the production planning system 4 to the production system 3. In step S9, the transmitted response message is checked at the production system 3 to determine, for example, whether the response message has the same key as the request message. In the interrogation Q4, it is then determined whether the data are valid; if this is the case, a new cutting plan is calculated in step S2. If the data in the interrogation Q4 were considered invalid, then no transmission of the data to step S2 takes place. As in the case of interrogation Q3, the original production plan is then continued or the production plan is changed on the basis of other specifications. This can be performed in such a way, for example, that scrap lengths are specified, or standard lengths are specified for certain grades, which are placed in store.

Although the invention has been illustrated and described more specifically in detail by means of the preferred illustrative embodiments, the invention is not restricted by the examples disclosed, and other variations can be derived therefrom by a person skilled in the art without exceeding the scope of protection of the invention.

LIST OF REFERENCE SIGNS 1 continuous casting plant
2 mold
3 production system
3a process and model calculation
3b memory
4 production planning system
4a production planning calculation
4b order book
5 closed-loop and/or open-loop control system
5a programmable logic controller
5b measuring instruments
5c control elements
6 liquid metal
7 strand
8 data line
9 decoupled bi-directional connection
10 flame cutting machine
21 cut edge
22 scrap region
23 width change range
24 changed width range
25 mold position
26 width change range
27 residual region
30 quality prediction
31 target quality
S1-S10 step
Q1-Q4 interrogation

The invention claimed is:

1. A dynamic production planning method for a continuous casting plant for casting a strand from a melt with a production system which has a predefined production plan, comprising:
    determining deviation of actual production parameters from setpoint production parameters by comparing the setpoint production parameters with the actual production parameters,
    responsive to the determination of deviation of the actual production parameters from the setpoint production parameters, creating a strand image on the basis of the actual production parameters, wherein the strand image comprises the strand which has already been cast and has not yet been cut, and at least that strand which is obtained on the basis of a residual weight in the continuous casting plant's tundish and predefined parameters,
    attempting to reconfigure the predefined production plan to compensate for the determined deviation of the actual production parameters from the set point production parameters,
    responsive to a determination that the predefined production plan cannot be reconfigured to compensate for the determined deviation, transmitting the strand image to a production planning system,
    creating with the production planning system a new production plan from all available orders on the basis of a predefined optimization criterion,
    transmitting the new production plan to the production system, wherein the predefined production plan is a cutting plan with a setpoint length, minimum length, maximum length, width and/or thickness, and wherein the optimization criterion is a maximum possible sales revenue with a minimum possible storage period or a maximum possible sales revenue with the prioritization of low-priority orders.

2. The dynamic production planning method for a continuous casting plant for casting a strand from a melt as claimed in claim 1, wherein the strand image is formed from at least one of the following parameters:
    width profile on the strand,
    width profile in the tundish,
    scrap positions and lengths,
    quality prediction for the strand,
    product limits of a calculated solution for product specification,
    target quality of specified products.

3. The dynamic production planning method for a continuous casting plant for casting a strand from a melt as claimed in claim 1, wherein a unique key, is calculated on the basis of the strand image and used in data exchange with the production system and the production planning system.

4. The dynamic production planning method for a continuous casting plant for casting a strand from a melt as claimed in claim 3, wherein the unique key is a hash code.

5. The dynamic production planning method for a continuous casting plant for casting a strand from a melt as claimed in claim 1, wherein a connection between the production system and the production planning system is a decoupled bi-directional connection.

6. The dynamic production planning method for a continuous casting plant for casting a strand from a melt as claimed in claim 1, wherein the actual production parameters and the setpoint production parameters are a casting speed of the strand, a casting level, a mold width, a strand cooling parameter, a temperature of the melt and/or a casting powder thickness.

* * * * *